INVENTOR.
GERARD KAROL VAN STEYN
BY D. R. Birchall
& W. A. Schaich
ATTORNEYS

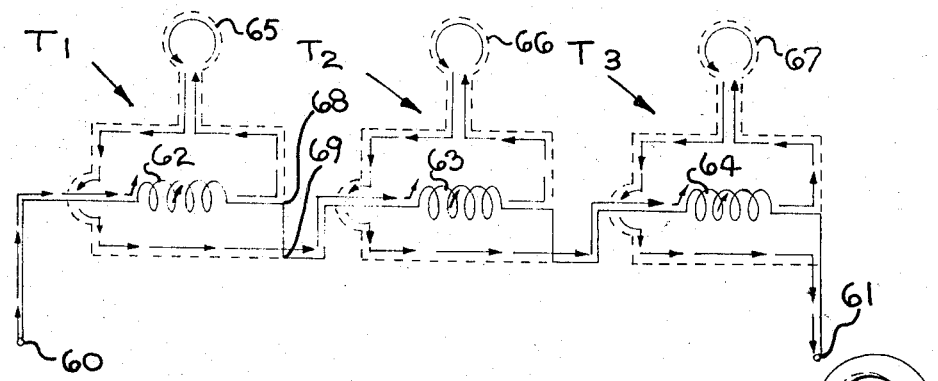
FIG. 4
FIG. 3
FIG. 5
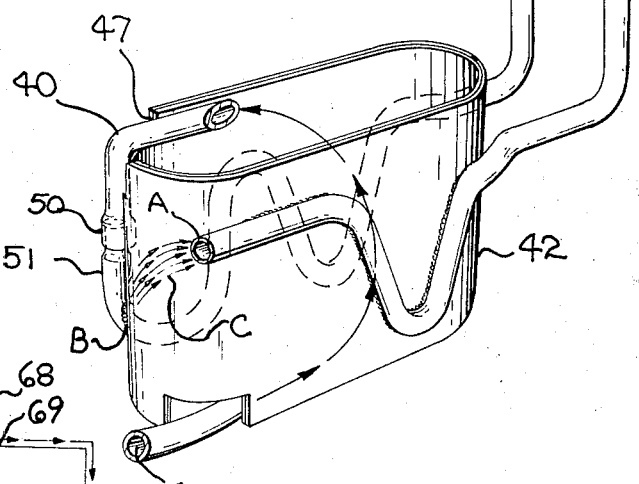
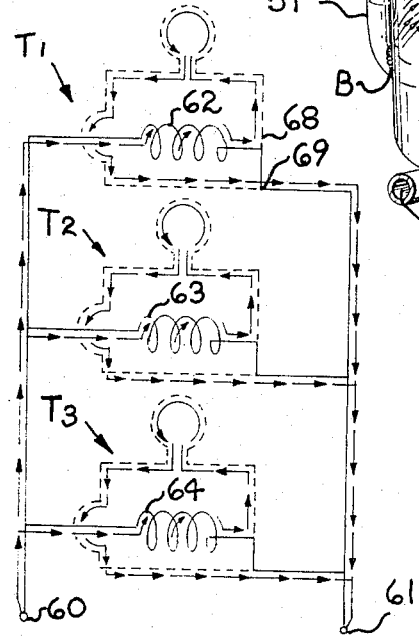
INVENTOR.
GERARD KAROL VAN STEYN
BY D. R. Birchall
& W. A. Schaich
ATTORNEYS

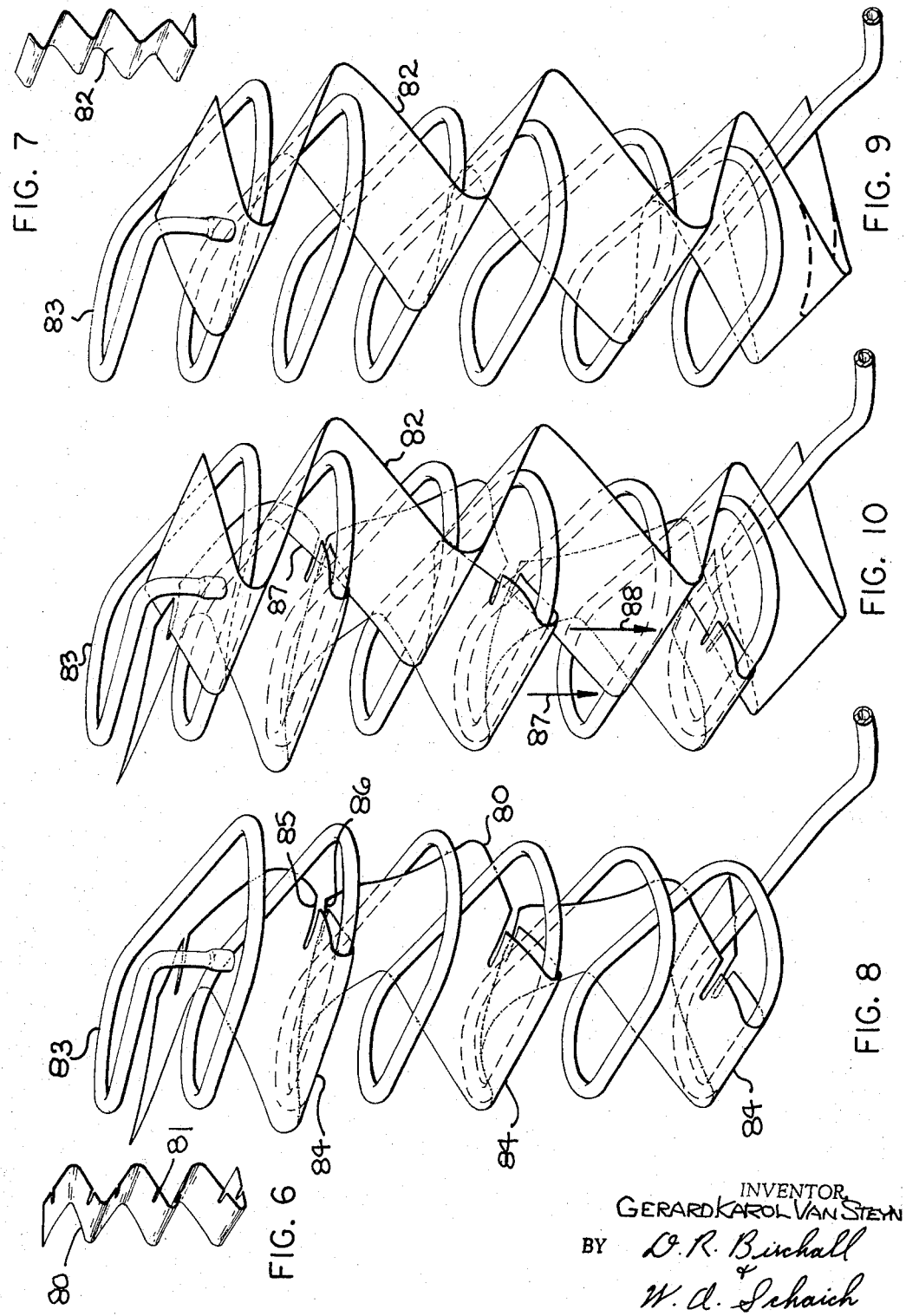

United States Patent Office 3,441,706
Patented Apr. 29, 1969

3,441,706
INDUCTION HEATING APPARATUS
Gerard Karol Van Steyn, Columbus, Ohio, assignor to Owens-Illinois, Inc., a corporation of Ohio
Filed Sept. 9, 1966, Ser. No. 578,383
Int. Cl. H05b 5/08
U.S. Cl. 219—10.75                           6 Claims

ABSTRACT OF THE DISCLOSURE

An apparatus for electrically heating a metal stud for insertion into the faceplate of a cathode-ray tube. The primary coil and the secondary coil having a portion of their circuitry common to each other. The primary and secondary coils being cooled by a common fluid source.

---

Figure 1:
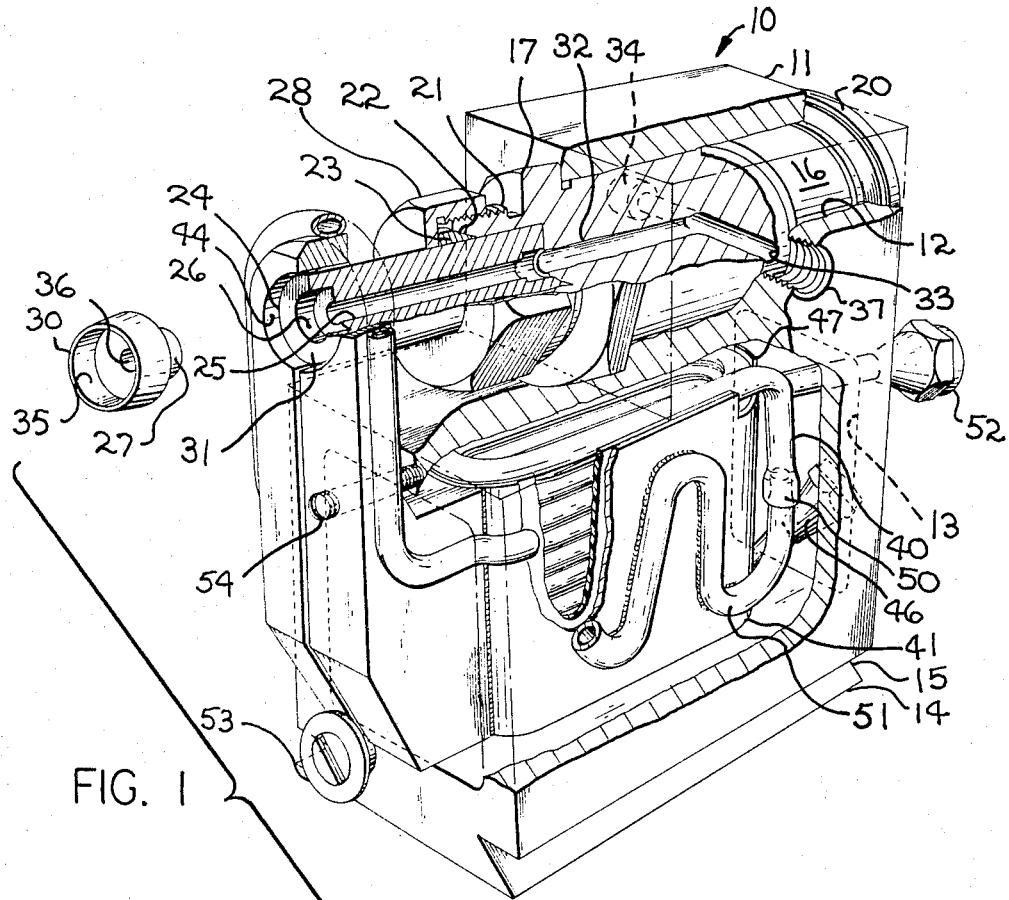

This invention relates to the heating of conductive objects by the utilization of high frequency energy. More particularly, the present invention relates to a transformer apparatus useful in heating small metal studs prior to their insertion into a glass article such as cathode-ray tubes.

During the manufacture of cathode-ray tubes and in particular colored television tubes, it is necessary to support the interiorly mounted components from the surface of the glass bulb. By way of example, the heavy mask employed in close proximity to the inside surface of the television tube is supported by a plurality of metal studs that are fused into engaging contact with the interior surface of the television faceplate. The metal studs must be accurately positioned and the metal-to-glass bond must develop adequate support strength and also a reliable seal must be achieved along the lines of juncture with the stud insert.

Heretofore a comman way in which the metal support studs were inserted into the interior edges of the television faceplate was to heat the glass surface where the stud was to be attached and also heat the stud by means of a gas flame. After the stud and glass were at the proper temperatures, the stud was forced into the glass. The inherent disadvantages of a gas flame heating system were that the flame could not be impinged circumferentially around the small stud so as to produce an even heat concentration within the stud while it was being inserted into the glass. As a result of uneven heating, a high percentage of unacceptable ware was produced because of bubbles or cracks in the immediate vicinity of the metal stud.

Anchor alternate method of inserting metal studs into glass articles such as television faceplates has been to employ electrical power and high frequency induction heating in conjunction with multi-turn induction heating coils in series with the tank coil of an induction heating generator. Induction heating, of course, is a high current phenomenon and involves a high rate of energy transfer over the air gap between the field-producing coil and the metal being heated. However, when a multi-turn heating coil is employed, there is a limitation on the number of coil turns that may be practical because of the small space requirement. The net result of a multi-coil for this application results in very low generator efficiencies, therefore, large output generators are required to obtain adequate heating of the stud to form a satisfactory glass-to-metal seal.

Then too, multi-turn coils because of their construction are loosely coupled electrically with the workpiece, hence a considerable amount of the coil efficiency is lost by the magnetic flux of one turn cutting through adjacent turns thus increasing the inductive reactance and resistance to current flow through the entire coil assembly.

In the particular application of continuously heating the metal stud while it is being inserted into the glass, it is necessary to retain the stud in a position almost entirely outside of the coil turns. In this position only the magnetic fringe area of the multi-turn coil can be utilized. It has been shown that a high-density field attenuates very rapidly as the distance from the primary current-carrying conductor increases, therefore if this method of stud metal heating is to be efficient, the metal to be heated must be placed in close proximity to the heating coil. One of the inherent disadvantages of a multi-turn induction coil if the flux density is not even and varies in strength. In induction heating, the magnetic field density should be made as high as practical in terms of the electric current and the equipment involved. In order to overcome this deficiency in a multi-turn coil, it is often necessary to employ large output generators to increase the current and intensify the field strength of the coil. Because of the variance in field strength, a multi-turn coil will produce cold spots or non-uniform heating of, for example, a metal stud.

In contrast to a multi-turn coil, a single turn induction coil operating from an efficient transformer will provide a more intense flux field and also provide a lower resistance to the flow of current since there is negligible inductive reactance and impedance. A single coil induction coil will provide a more uniform heating of a metal stud.

According to the present invention, electrical power is employed to heat the metallic stud prior to and during its insertion into the interior glass wall of the television tube. A transformer for the utilization of relatively high frequency electrical power has been conceived wherein the single inductor coil is of such design to be electrically efficient and physically small enough to be mounted in a very confined area close to the workpiece and metal-to-glass sealing position. The size of the transformer becomes important when the following is considered. In conventional transformers, the overall structure is large and cumbersome and cannot be placed in close proximity to the work coils, therefore, long connecting leads are required to connect the work coils to the low voltage terminals of the transformer. The increased electrical resistance obtained with the extended leads in the low voltage circuit of the transformer secondary coil cancels the effectiveness of the transformer thus large output generators are employed to compensate for the drop in power output.

Coupled with the transformer is a collet-type chucking device to hold the metal stud in precise and accurate relationship to the single turn induction coil while the stud is being heated and inserted into the glass.

It is the primary object of this invention to provide a high frequency transformer capable of heating a metallic stud to the required temperature while supporting it and while applying a force thereto.

Another object of the present invention is to provide a transformer, for utilization of a high frequency power input, wherein the secondary coil contains a single coil close looped on the primary coil.

A further object of the present invention is to provide a transformer wherein the inductor is an integral part of the single turn secondary coil.

An additional object of the present invention is to provide a transformer that can be readily repaired with a minimum of downtime required.

A further object of the instant invention is to provide a high frequency induction heating device that produces an even temperature over all sections of the part being heated within the secondary coil thereof.

An object of this invention is to seal a metal insert to the interior of a hollow glass member such as the faceplate of a color television picture tube.

Another object of this invention is to provide an efficient transformer and induction heating coil combination wherein one set of water cooled leads are required for the primary interconnected to the secondary and the inductor to provide a single and common means of cooling the primary, secondary and inductor turns.

Another object of this invention is to provide an efficient transformer and induction coil combination wherein several units can be operated from a single induction heating generator in a series or parallel arrangement.

Another object of this invention is to provide a method of wrapping the insulation on the coils of an induction transformer.

Figure 2:
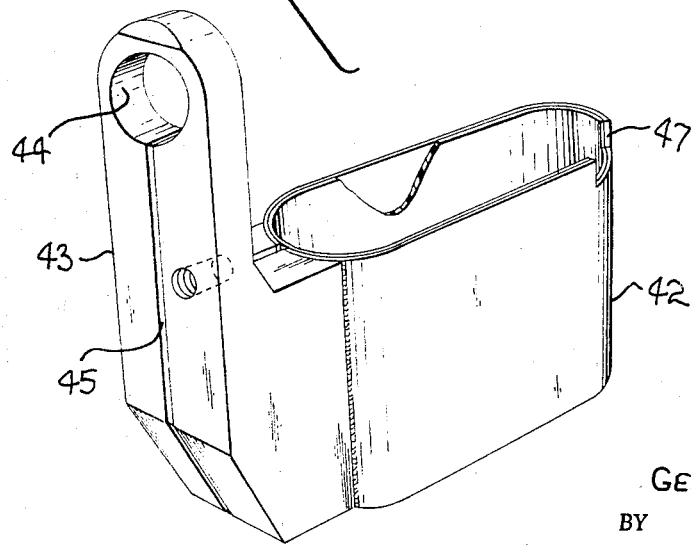

For a better understanding of the invention, reference is made to the acompanying drawings wherein:

FIG. 1 is a perspective view broken away in part and sectioned to show the various parts of the transformer, FIG. 2 is a perspective view showing the front of the secondary coil, FIG. 3 is a view showing the rear of the secondary coil and the electrical and cooling fluid inlet and outlet, FIG. 4 is a schematic diagram showing a plurality of transformers connected in series, FIG. 5 is a schematic diagram showing transformers in parallel, FIG. 6 is a perspective view showing part of a folded strip of insulation for the primary coil, FIG. 7 is a view similar to FIG. 6 that shows the mating half of the insulation for the primary coil, FIG. 8 is a perspective view showing the insulation positioned on one half of the primary coils, FIG. 9 is a view showing the insulation strip of FIG. 7 in place on the primary coil, FIG. 10 is a perspective view showing the interlocking relationship between the insulation strips.

Referring now to FIG. 1 wherein is shown at 10 an overall perspective view of the induction heating transformer assembly of this invention. A box-like frame 11 constructed from ceramic or other materials that can withstand a moderate degree of heat, is fabricated with a bore 12 extending therethrough. An additional aperture 13 aligned generally parallel to bore 12 is placed through the lower portion of frame 11. Aperture 13 is ideally of near rectangular configuration so that it can accomodate the electrical coils that are placed therein. A tongue 14 and groove 15 arrangement is placed along the two bottom longitudinal edges of frame 11 to facilitate movement or positioning of the transformer assembly in a stud insertion machine.

A cylindrical indexing bar 16 is machined to fit snugly into bore 12 of frame 11. Bar 16 contains a flanged section 17 having a hexagonal exterior wrenching surface. Bar 16 is threaded at the end opposite flanged section 17 so that a nut 20 can be engaged therewith to immobilize indexing bar 16 in frame 11.

Protruding longitudinally along the axis of bar 16 and connected to flanged section 17 is a hollow exteriorly threaded collet receiving end 21. The front interior of end 21 is beveled at 22 so that it may receive collet 23. A nut 28 is engaged with the external threads on end 21. By tightening nut 28 collet 23 can be wedged into the beveled portion 22 of end 21. Collet 23 is constructed so that it can be radially constricted thus firmly grasping the ceramic stud holder 24. Stud holder 24 is preferably constructed from a material such as aluminum oxide and has an overall cylindrical configuration. A passage 25 is placed longitudinally through the entire stud holder and terminates at both ends with an enlarged section tailored to closely fit the exterior dimensions of a metal stud. For example, cylindrical section 26 conforms closely to an exteriorly cylindrical section 27 of a stud such as that shown at 30 in FIG. 1. Beveled interior surface 31 also conforms to the geometry of the back side of stud 30.

Both ends of ceramic stud holder 24 are adapted to grasp a stud such as 30. In this manner should one end of holder 24 become enlarged or broken, it is a simple operation to loosen nut 28 thereby releasing the gripping action of collet 23. Ceramic stud holder 24 can then be turned end for end with little downtime resulting in production.

As mentioned before, stud holder 24 is equipped with a passage 25 therethrough. Passage 25 communicates with passage 32 which terminates exteriorly of indexing bar 16 at opening 33. Opening 33 can be positioned as shown in FIG. 1 as it exits on the right-hand side of the assembly. Indexing bar 16 can also be equipped with an additional exit as shown in dotted lines at 34. The combination of passages 25 and 32 provide a means of applying a vacuum to the exterior surface of stud 30. If desired, the stud 30 may have an aperture such as 36. A vacuum line can be attached as threaded aperture 37 in frame 11.

Positioned within aperture 13 of frame 11 is a removable combination of primary coil 40 and secondary coil 41. The secondary coil 41 can best be seen in FIG. 2, a sheet of copper is formed into a flattened loop container as shown at 42. Container 42 is of substantial thickness in the range of 0.70 inch. Container 42 has attached at both ends thereof a split block of copper 43. The purpose of using a heavy inductor block such as 43 is for rigidity and cooling rather than for increasing the conductance. Block 43 may be attached to the ends of container 42 by soldering or brazing. The top portion of split block 43 is opened up to define a cylindrical aperture 44. The space between each half of block 43 is maintained by inserting therein an insulating medium such as a sheet of Teflon as shown at 45. The combination of split block 45 and loop container 42 form the complete single coil secondary loop of the induction transformer of this invention.

Contained within the loop container section 42 of the secondary coil is primary coil 40 as can be seen in FIG. 1 and FIG. 8. The primary coil 40 is constructed of copper tubing and has been flattened somewhat in one plane, however the internal passage remains open throughout the entire length of the coil and the external surface area remains unchanged. The primary coil 40 is constructed to fit inside the loop container and is insulated therefrom by a sheet of insulating material. All turns of the primary coil are also insulated with respect to each other as will be commented upon infra. The bottom end of the primary tube terminates exteriorly of frame 11 with fitting 46 as shown in FIG. 1. The top end of the primary tube exits through notch 47 in the top wall of loop container 42. The primary tube progresses from exit notch 47 to joint 50 where an attachment is made to tube 51 which is of similar cross-section to the tubular construction of the primary coil 40.

Tube 51 is attached to the exterior of the loop container 42 by soldering. Tube 51 progresses from the rear to the front of loop container 42 in a sinuous path thus providing a more efficient cooling medium for loop container 42. Tube 51 which is actually an extension of the primary coil, progresses from loop container 42 to the exterior surface of split block 43. Tube 51 is mounted over and around aperture 44 as can be seen in FIG. 1. Tube 51 passes over the other side of loop container 42 and terminates with fitting 52.

Also shown in FIGS. 1 and 2 are adjustable screws 53 and 54. Screw 54 is threaded through one half of split block 43 and biases against the external surface of frame 11. Screw 53 is threaded into frame 11 and the flange thereof is free to ride against the exterior of split block 43. By loosening screw 53 and tightening screw 54, the entire secondary coil including the loop container can be moved longitudinally in and out of rectangular aperture 13. The value of this adjustment will be further explained elsewhere.

FIG. 3 shows a view looking at the side of the loop container 42 most remote from the split block 43. The exit line from tube 51 is shown in soldered attachement to the exterior of loop container 42. The soldered contact between tube 51 and the side of loop container 42 is maintained until tube 51 moves tangentially away from loop container 42 at point A. The exit line from primary coil 40 can be seen as it exits through notch 47 and progresses to joint 50. From joint 50 tube 51 is directed toward the exterior of loop container 51 and is soldered thereto beginning at point B.

In tracing the flow of electrical energy and the cooling medium through the transformer, the electrical energy and cooling medium enter through fitting 46 and circulate through the spirally oriented primary coil of the transformer. Both electircal energy and the cooling medium exit from the top of the primary coil, through notch 47 and joint 50 and hence to point B as shown in FIG. 3. At point B the electrical energy no longer will follow the path defined by tube 51 as it progresses across the side of loop container 42. Since the electrical energy is traveling primarily on the surface of the conducting tube 51, it can readily travel over the path of least resistance to point A. The path of least resistance is over the surface of that portion of loop container 42 which lies between points B and A and is depicted in FIG. 3 by arrows C. Once the electrical energy has reached point A, it can once again travel along tube 51 and exit through fitting 52. Thus it can be ascertained that primary coil 40 is energized by the flow of electrical energy through the lead-in tube, through the convolutions of the primary coil, across a portion of loop container 42, and through the exit tube.

As pointed out above, the cooling medium and electrical energy for energizing the primary coil shared a common conductor until point B was reached. Since the cooling medium is confined to the interior of the tube structure, it cannot be carried across a portion of the loop container as was the electrical energy. The cooling medium flows from point B through tube 51 which is attached to the exterior of loop container 42, up over and around the split block 43 and hence along the opposite side of loop container 42 to point A. The cooling medium can then exit along with the electrical energy through fitting 52.

As described above, the circulation of the cooling medium through a single tube cools the primary and secondary coils of the transformer, including the split block inductor. The combined circular electrical path provided around loop container 42 and split block 43 will be recognized as the single loop secondary coil of the transformer. That portion of the secondary transformer between points A and B serves a dual purpose in that the electrical energy of the primary coil is carried across the exterior surface and at the same time, the interior surface is carrying the induced electrical energy of the secondary coil.

The fact that the primary and secondary coils can have a portion common to both circuits can be explained in the following manner. It is well known that when a conductor such as copper is carrying a direct current, the current density is uniform across the cross-section of the conductor. If an examination is made of the same conductor when an alternating current of a few cycles per second is flowing, it will be noted that the current has a slight tendency to crowd to the outer surface of the conductor because the electro-magnetic induction increases the impedance of the inner filaments of the conductor. This, in turn, manifests itself as a decrease in cross-section of the conductor, and increases the effective resistance. As the frequency of the alternating current is increased, the so-called "skin effect" becomes more and more pronounced until at the frequencies which are used for high-frequency induction heating, the current is flowing in the shell made up of approximately the outer five thousandths of the conductor.

FIG. 4 shows a schematic diagram for transformers T1, T2 and T3 including both the electrical circuitry and the flow of the cooling medium. A high frequency alternating current is attached to terminals 60 and 61. The current can flow from terminal 60 to primary coil 62. After passing through primary coil 62, the current can by a series connection flow through primary coils 63 and 64 and hence to the other terminal 61. Since the current in a series wiring arrangement is constant, each transformer primary will have essentially the same power. Secondary coils 65, 66 and 67 are shown by means of a dashed line. The portion of the schematic from 68 to 69 shows that the primary and secondary circuits share the same electrical path.

Also shown in FIG. 4 is the flow diagram for the cooling medium. The arrows commencing at terminal 60 show that the cooling medium flows through the primary coil until it reaches point 68. At 68 the cooling medium then circulates through the single loop of the secondary coil 65 until it reaches point 69. From 69 the cooling medium can progress to the next transformer. Any number of transformers can be cooled by this process so long as the quantity and velocity of the cooling medium is kept below the boiling temperature. Instead of the cooling medium being in series as shown in FIG. 4, the cooling medium can be arranged in a parallel hook-up so that a common header would feed T1, T2 and T3 from a common source.

FIG. 5 shows a variation in the electrical diagram for transformers T1, T2 and T3. The current flow in each of the respective transformer circuits will not remain theoretically equal, however for all practical purposes the current can be maintained constant by a method described hereinafter. Coils 62, 63 and 64 are fed from a common source such as terminals 60 and 61. The electrical connection between the primary coils and their single loop secondary coils is made the same as previously described in conjunction with the series diagram of FIG. 4. The cooling medium enters at 60 and is diverted to each individual transformer thus delivering a cooling medium to each one of the transformers at nearly the same temperature. In the parallel hook-up as shown in FIG. 5, the primary coils and the secondary share a common interconnection from 68 to 69 as in the previously described series hook-up. While three transformers have been described, it is understood that this is by way of illustration and not to be considered as a limitation.

FIG. 6 shows a strip 80 of insulation prepared from sheet stock insulator material such as for example Teflon. Small cuts or excisions 81 have been removed from one side of strip 80. The width of the cuts 81 can be in the order of 0.20 inch since the overall thickness of the insulation is of that order of thickness. Cuts 81 are spaced along one edge of strip 80 at predetermined intervals that correspond to the distance from one convolution to the next adjacent convolution of the coil to be insulated.

FIG. 7 is similar to FIG. 6 except that it depicts an insulation strip 82 that is complementary to strip 80. Strip 82 does not contain cut-out notches as does its mating strip 80.

FIG. 8 shows a copper tube 83 that has been convoluted into a plurality of turns thus forming the primary coil for a high frequency induction heating transformer. In the actual coil, each turn would be in close proximity to the adjacent turn in order to minimize the space and increase the flux density, however for purposes of illustration, the primary coil has been expanded to more clearly show how the insulation is placed therein. Strip 81 is fed through the first convolution at the top of the coil. It is then interwoven back and forth so that it passes over every other convolution such as at 84. Normally when strip 80 is in interwoven position, the slots or cut-outs from one pass or layer of the insulator strip 80 will be spaced some distance from the next immediate cut-out. In FIG. 8 cut-out 85 and the next immediate cut-out 86 are purposely shown together so that the complementary strip 82 can be inserted therein.

FIG. 9 shows strip 82 interwoven through every other convolution of tube 83. Strip 82 is woven in opposite hand to the orientation of strip 80. Strip 82 thus passes over those portions of coils that are not contacted by strip 80.

Referring now to FIG. 10, the insulation strips 80 and 82 have been pushed together into intercalated relationship. The innermost edge 87 of strip 82 has been fed through both cut-outs 85 and 86. This process is repeated for each convolution where strips 80 and 82 abut each other.

When the convolutions of tube 83 are adjacent each other, the insulation is overlapped as shown by arrows 87 and 88. The overlapping of insulator strips 80 and 82 provides an adequate barrier against the shorting of high frequency energy from one part of the primary coil to another part. The only interruption in the continuous train of the insulator strips are cut-out sections 81, and they fall within the central section of the coil and remote from the vicinity of the surface of tubing 83.

Since the voltage across the primary coil is high, it imposes a spacing and insulation problem at all points where adjacent parts of the circuit have potentials existing between them. Because of the ability of the high frequency potential gradient to ionize the surrounding madium, whether it be air or another gas, additional safety factors must be introduced to compensate for this effect. To effectively combat the potential existing between the turns of the primary, a good insulator such as Teflon is positioned in intercalated fashion between the coils. In this manner arc-over can be prevented. Once arc-over occurs, and the surrounding gases become ionized, the failure may spread to other parts of the circuit thus causing considerable damage before the circuit can be deenergized.

The above method of insulating the primary coil of a transformer can be made with very simple insulation materials and a very simple geometrical configuration is required. The actual assembly of the simplified insulation can be accomplished with a minimum of time required. Additionally, the repair or replacement of the insulation can be done with a speed heretofore unattainable.

Any one of the basic types of equipment can be used with the present invention for converting the electrical energy to a frequency suitable for induction heating. For the purposes of this invention, high frequency energy from a motor generator set, a spark-gap converter, a vacuum-tube oscillator or an inverter is suitable for induction heating.

When a 7½ kw. high frequency generator such as a vacuum tube oscillator that employs a triode working in conjunction with a "tank" circuit is used to supply electrical energy having a frequency in the range of 450 kc., the transformer of this invention, when coupled with three coils in series, will work at approximately 42 percent of the generator capacity. When a 5 kw. generator is used, the transformer requires only 60 percent of the generator capacity in order to do the work required. One of the inherent advantages of being able to work at a lower power demand is the increased power factor efficiency. It is well known that induction devices such as described herein must be balanced with capacitive reactance in order to offset the inductive reactance created by the transformer coils. The fewer parts and circuitry required also add to the overall efficiency.

In the construction of the transformer, the primary coil is constructed from 3/16 inch copper tubing that has been flattened to conserve the overall height between coils of the transformer. The flattening does not deter from the current carrying capacity since the current has a tendency to flow on the surface of the conductor. Theoretically, in a 200 ampere circuit and a 12 to 1 ratio transformer, the current circulating in the single turn secondary coil would be 2400 amperes. The above transformer compares to the same 200 ampere circuit and 1000 amperes in current in a secondary coil containing five turns. An additional advantage afforded by the single turn secondary coil is that the conductive part placed within the magnetic field is heated at a very uniform rate over its entire surface. A multi-coil secondary has the tendency to produce cold spots in the part to be heated. By using a single turn secondary coil with its inherently high density magnetic flux, there results less magnetic fringe effects when compared to a loosely coupled multi-turn coil. Thus, the axial position of the stud relative to the induction coil is much less critical, thereby permitting axial adjustments to be made with less overall effect on the heating role of the part that is to be heated.

During assembly of the transformer, the primary coil is insulated between the coils by the method heretofore set forth. A sheet of insulating material is placed adjacent to the interior of the loop container 42. The primary coil is then inserted into the space within 42 which actually is part of the secondary coil. The end primary coil 40 has been pretailored to extend through notch 47 and extend parallel to the exterior of loop container 42. Joint 50 is soldered thus connecting the terminal end of coil 40 to tube 50. The importance of this joint will be fully appreciated when it is necessary to overhaul the transformer. Joint 50 can be quickly broken by the application of heat, fitting 46 and the short tube that connects it to the main portion of coil 40 can be bent downward and the entire coil can be disassembled for the installation of new insulation or a new coil. A minimum of downtime is required to service the primary coil of the transformer.

The combination of the primary and secondary coils can be installed with ease in frame 11 and contained against removal thereof by screw 53 which is threaded into the base of frame 11. Exact positioning of the transformer can be attained with respect to the frame 11 by use of set screw 54 which is threaded into split block 43 and biased against the exterior of frame 11. For example, if it has been determined that the stud in one of a plurality of electrically interconnected transformers is heating too hot or fast with respect to the remainder of studs, that particular stud can be moved axially with respect to a line normal to the magnetic field produced by the cylindrical section of the secondary coil. By increasing or decreasing the amount of field cut by the stud, the induced current or production of heat can be controlled. Thus by adjusting screws 53 and 54, the amount of power needed by the transformer can be regulated.

During the operation of the transformer as illustrated in FIG. 1, a metal stud, for insertion into a glass article such as the interior surface of a television faceplate, is positioned so that the smaller end thereof is in approximate alignment with the cylindrical opening 26 in ceramic stud holder 24. The stud is drawn into final seating engagement with stud holder 24 by a force resulting from the reduced pressure or vacuum that is applied through passages 25 and 32. The stud fits firmly into the recess provided in stud holder 24, however enough space is provided around cylindrical section 27 of stud 30 to compensate for growth in the stud caused by a rise in temperature from ambient conditions to an incandescent red heat well above the Curie point.

The current in the secondary coil must continue to supply heat to the stud after it has contacted the glass surface. The flow of heat from the stud into the surrounding glass is quite high and as a result, the glass soon becomes molten thus permitting the stud to penetrate the glass mass. After the stud has attained its maximum depth into the glass as a result of a force applied externally and through frame 11 of the transformer, it is often desirable to partially extricate or retract the stud from its point of maximum penetration to form a more uniform fillet of glass between the stud and the remainder of the glass article. The entire transformer can be backed away from the glass surface, and the stud likewise will move because of the biasing force provided by the vacuum line that is attached to the stud.

While certain representative embodiments and details have been shown for the purpose of illustrating the invention, it will be apparent to those skilled in this art that various changes and modifications may be made therein without departing from the spirit or scope of the invention.

What is claimed is:

1. In a high frequency transformer for induction heating comprising a primary coil and a secondary coil, said primary coil constructed from a plurality of interconnected convolutions of a centrally apertured conductor that is positioned within the confinement of said secondary coil, said secondary coil comprised of at least one convolution of an electrical conductor, said apertured conductor extending from said primary coil and surrounding said secondary coil so that a cooling medium can circulate through said primary coil and through said secondary coil in an uninterrupted flow pattern, said primary and secondary coils united with a common electrical conductor over a portion of the secondary coil.

2. A high frequency transformer for induction heating as claimed in claim 1 wherein the apertured conductor that surrounds the secondary coil is metallically attached thereto and in intimate contact therewith.

3. In a high frequency transformer for stepping up a current fed therein so that it may be deployed in induction heating of a conductor comprising a primary coil and a secondary coil, said primary coil containing a plurality of windings formed from a conductor of tubular configuration, the windings of said primary coil positioned within the structural confinement of said secondary coil, said secondary coil comprised of at least one winding with a space therein for said primary coil and a space therein for placement of a conductor in which it is desired to induce a heat producing current, the tubular conductor of said primary coil extending outwardly from the confinement of said secondary coil and surrounding said secondary coil, said outwardly extending portion of said primary coil coupled to the exterior of said secondary coil so that there can be an interexchange of heat therebetween by the circulation of a cooling medium through the entire extent of said tubular conductor, said primary coil current flowing over a portion of the exterior of said secondary coil and the induced current in the secondary coil flowing over the interior of the common conductor united with both of said coils.

4. A high frequency transformer for induction heating as claimed in claim 3 wherein said tubular conductor is of sinusoidal configuration as it traverses a portion of the secondary coil.

5. In a high frequency transformer for induction heating comprising a housing with a plurality of apertures therein to accommodate the various parts of the transformer, a primary coil constructed from a partially flattened metal tube and convoluted in a spiral path so that the coil is flattened along two sides thereof, a secondary coil comprising a thick section and a thin section united together to produce a unitary electrical path for an induced current, said thick section folded upon itself with an aperture at the bight thereof and insulation between the remaining adjacent halves, said thin section formed from sheet stock with an aperture centrally positioned and having a height substantially equal to the height of the convoluted primary coil and of a flattened configuration to be spaced approximately equidistant from the outermost surface of the convolutions of the secondary coil, said primary coil housed within said secondary coil and insulated therefrom, said primary and secondary coils positioned within an aperture in said housing with the apertured end of the thickened section of the secondary coil cantilevered in a vertical direction away from the base of said housing, a ceramic insulator cantilevered from a holding cylinder that is immobilized in an aperture in said housing, a collet for clamping said ceramic insulator in fixed position so that the free end thereof is concentrically positioned within the aperture at the bight of the vertically extending section of said secondary transformer, said ceramic insulator having an insert retaining recess in at least one end thereof and a centrally located bore in communication between the ends of said insulator; a connection between the tube which forms the primary coil and a secondary coil cooling tube of similar cross-sectional configuration that is adhered to the external surface of the thin section of said secondary coil, said secondary coil cooling tube forming a sinusoidal path as it crosses the sides of said thin section, said secondary coil cooling tube adhered to the exterior of said thick section; said primary coil and said secondary coil sharing a common conductor which is a portion of the thin section of said secondary coil.

6. In a high frequency transformer for induction heating as claimed in claim 5 wherein the convolutions of the primary coil are insulated one from the other by two intercalated strips of insulating material.

References Cited

UNITED STATES PATENTS

| 2,314,865 | 3/1943 | Bierwirth | 219—10.75 |
| 3,300,614 | 1/1967 | Sorensen | 219—10.75 X |

RICHARD M. WOOD, *Primary Examiner.*

L. H. BENDER, *Assistant Examiner.*

U.S. Cl. X.R.

219—10.79